United States Patent [19]
Krantz et al.

[11] Patent Number: 5,482,222
[45] Date of Patent: Jan. 9, 1996

[54] LIGHTWEIGHT SOLID-CORE VIDEO CASSETTE CARTRIDGE

[75] Inventors: Kermit T. Krantz; Charles R. Jones, Jr., both of Leawood, Kans.

[73] Assignee: V-Lite Corporation, Leawood, Kans.

[21] Appl. No.: 343,369

[22] Filed: Nov. 22, 1994

Related U.S. Application Data

[63] Continuation-in-part of Ser. No. 1,670, Jan. 7, 1993.
[51] Int. Cl.⁶ .................................................. G11B 23/087
[52] U.S. Cl. ............................................ 242/347; 242/345.2
[58] Field of Search ................................. 242/347, 347.1, 242/345.2; 360/132; 206/389, 391, 403, 409

[56] References Cited

U.S. PATENT DOCUMENTS

| | | |
|---|---|---|
| 4,290,567 | 9/1981 | Saito . |
| 4,438,892 | 3/1984 | Fitterer et al. . |
| 4,452,407 | 6/1984 | Ogata et al. ........................ 360/132 |
| 4,453,683 | 6/1984 | Reimer et al. . |
| 4,505,440 | 3/1985 | Kawashima ........................ 360/132 |
| 4,559,574 | 12/1985 | Umeda ............................... 242/345.2 |
| 4,763,218 | 8/1988 | Westfall et al. . |
| 4,802,048 | 1/1989 | Perkins et al. . |
| 4,819,890 | 4/1989 | Carroll . |
| 4,842,217 | 6/1989 | Vinson . |
| 4,883,176 | 11/1989 | Hart et al. . |
| 4,969,612 | 11/1990 | Thomas . |
| 5,092,536 | 3/1992 | Gelardi et al. . |
| 5,114,092 | 5/1992 | Gelardi et al. . |
| 5,146,376 | 9/1992 | Imanaga et al. .................... 360/132 |
| 5,199,662 | 4/1993 | Klupt . |
| 5,199,663 | 4/1993 | Klupt . |
| 5,201,476 | 4/1993 | Gelardi et al. . |
| 5,398,881 | 3/1995 | Krantz et al. ....................... 242/347 |

FOREIGN PATENT DOCUMENTS

| | | |
|---|---|---|
| 2104872A | 3/1983 | Japan . |
| 1552251 | 9/1979 | United Kingdom ............. 242/343.2 |
| 2074130 | 10/1981 | United Kingdom .............. 360/132 |

*Primary Examiner*—John P. Darling
*Attorney, Agent, or Firm*—Hovey, Williams, Timmons & Collins

[57] ABSTRACT

A lightweight solid-core video cassette cartridge is provided. The lightweight solid-core video cassette cartridge includes a cartridge shell and a solid-core structural member. The cartridge shell includes spaced apart top and bottom panels which define an interior hollow chamber therebetween. A pair of video tape reels are positioned within this hollow chamber for winding video tape. The solid core structural member is provided for maintaining the spaced relationship of the top and bottom panels. The solid core structural member is formed of lightweight materials such as styrofoam, cardboard or synthetic resin. The solid core structural member and the video tape reels fill substantially the entire volume of the cartridge shell hollow chamber.

8 Claims, 3 Drawing Sheets

LIGHTWEIGHT SOLID-CORE VIDEO CASSETTE CARTRIDGE

RELATED APPLICATION

The present application is a continuation-in-part of U.S. patent application Ser. No. 08/001,670, filed Jan. 7, 1993, titled LIGHTWEIGHT VIDEO CASSETTE CARTRIDGE.

FIELD OF THE INVENTION

The present invention relates to an inexpensive, limited use video cassette cartridge formed of lightweight, recyclable materials, and more particularly to a lightweight video cassette cartridge including a solid inner-core for providing structural rigidity to the cartridge. The cartridge also includes reel springs formed of sponge material such as foam or rubber for maintaining the alignment of the cartridge's video tape reels.

BACKGROUND OF THE INVENTION

The recent proliferation of video cassette players and recorders has created a new market for video taped advertisements and messages. This new market has created an enormous demand for inexpensive and lightweight limited use video cassette cartridges that are suitable for mailing. These cassettes are also suitable for non-commercial recordings such as public service announcements and personal messages sent to family and friends.

Lightweight limited use video cassette cartridges are known in the art. However, prior art limited use video cassette cartridges suffer from several limitations. For example, many prior art video cassette cartridges contain numerous individual parts formed of various materials. The use of such a great number of parts raises the cost and manufacturing time of the cassette cartridges. Additionally, prior art video cassette cartridges are formed of heavier materials, and thus are costly to transport and mail.

A more particular limitation of prior art limited use cassette cartridges is their lack of structural rigidity. Prior art cassette cartridges typically include a cassette shell formed from a pair of mating top and bottom panels. The panels are typically connected by a plurality of support posts or columns. A pair of video tape reels are positioned between the panels for winding video tape. This prior art construction suffers from several limitations. For example, to provide space for the video tape reels, the support posts have to be spaced a sufficient distance apart. This results in a finished cassette cartridge which is weak and flimsy. As those skilled in the art will appreciate, lightweight video cassette cartridges are often mailed and thus are exposed to rough handling. The support posts of prior art video cassette cartridges commonly break or dislodge when subjected to these forces. Moreover, the support posts are difficult to align when mating the top and bottom cartridge shell panels. Thus, these prior art support posts significantly add to the cost and time of manufacture of cassette cartridges.

Another limitation of prior art limited use cassette cartridges is that they include complicated and costly reel spring mechanisms. As discussed in detail in copending U.S. patent application Ser. No. 08/001,670, filed Jan. 7, 1993, titled LIGHTWEIGHT VIDEO CASSETTE CARTRIDGE, the video tape reels of cassette cartridges are subjected to an upward force from the VCR drive spindles which tends to push the reels upward towards the top panel and out of alignment. To compensate for this upward force and to keep the video tape reels in alignment, various reel spring devices have been developed. Although these prior art reel springs are effective, they are complicated, costly and too heavy for use in limited use video cassette cartridges which must be inexpensive and lightweight. Copending U.S. patent application Ser. No. 08/001,670 provided a novel reel spring design which overcame this particular limitation.

The limitations described above prevent advertisers and consumers from making full use of lightweight limited use video cassette cartridges. Thus, there is a need for an improved lightweight video cassette cartridge.

SUMMARY AND OBJECTS OF THE INVENTION

In view of the limitations of prior art video cassette cartridges described above, it is an object of the present invention to provide an improved lightweight limited use video cassette cartridge which is inexpensive to manufacture and mail.

It is another object of the present invention to provide a lightweight limited use cassette cartridge which is sufficiently rigid to withstand rough handling and mailing.

It is another object of the present invention to provide a lightweight limited use cassette cartridge which is formed with a solid-core instead of support posts.

It is another object of the present invention to provide a lightweight limited use cassette cartridge which includes reel springs which effectively maintain the alignment of the video tape reels without adding significant weight to the cartridge.

It is another object of the present invention to provide a lightweight limited use cassette cartridge which includes reel springs which are simple to manufacture and inexpensive.

In accordance with these and other objects evident from the following description of a preferred embodiment of the invention, an improved lightweight video cassette cartridge is provided. The preferred lightweight solid-core video cassette cartridge broadly includes a cartridge shell presenting a hollow interior chamber and a solid-core structural member which substantially fills the entire volume of this interior chamber.

In more detail, the cartridge shell includes spaced apart top and bottom panels which define an interior hollow chamber therebetween. A pair of video tape reels are positioned within this hollow chamber for winding video tape.

The solid core structural member is provided for maintaining the spaced relationship between the top and bottom panels. The solid core structural member is a single piece unitary core member and is preferably formed of lightweight materials such as styrofoam, cardboard, synthetic resin, inflated or expanded corn starch, carbon fiber or fiberglass. The solid core member may be formed of honeycomb or corrugated layers. The solid core member also includes walls defining a pair of circular reel wells. The video tape reels are rotatably mounted within the circular reel wells.

A pair of reel springs are provided for maintaining the alignment of the video tape reels within the cartridge. In preferred forms, the reel springs are bonded inside the top panel of the cartridge and are formed of lightweight sponge material such as foam or rubber. Copending U.S. patent application Ser. No. 08/001,670 provides another novel reel spring design.

To assemble the cartridge, the top and bottom panels are secured to the solid core member by conventional adhesives such as glue or tape. In preferred forms, the solid core structural member and the video tape reels fill substantially the entire volume of the cartridge shell hollow chamber.

With this construction, numerous advantages are obtained. For example, since the solid-core member fills substantially the entire volume of the cartridge shell hollow chamber, the entire surface areas of the top and bottom panels are supported by the solid core member. Accordingly, the assembled video cassette cartridge has substantial rigidity. This allows the cartridge to withstand rough handling and mailing.

Additionally, since the video cassette cartridge is formed from a limited number of parts, it is easy to manufacture and assemble. Moreover, since the cartridge components are all formed from lightweight materials, the assembled cartridge is lightweight and inexpensive to mail.

Another advantage of the present invention is that the reel springs of the cartridge effectively maintain the alignment of the video tape reels without adding significant weight to the cartridge. The reel springs are also simple to manufacture and are inexpensive.

BRIEF DESCRIPTION OF THE DRAWINGS

A preferred embodiment of the present invention is described in detail below with reference to the attached drawings, wherein.

DETAILED DESCRIPTION OF THE PREFERRED EMBODIMENT

Figure 1:
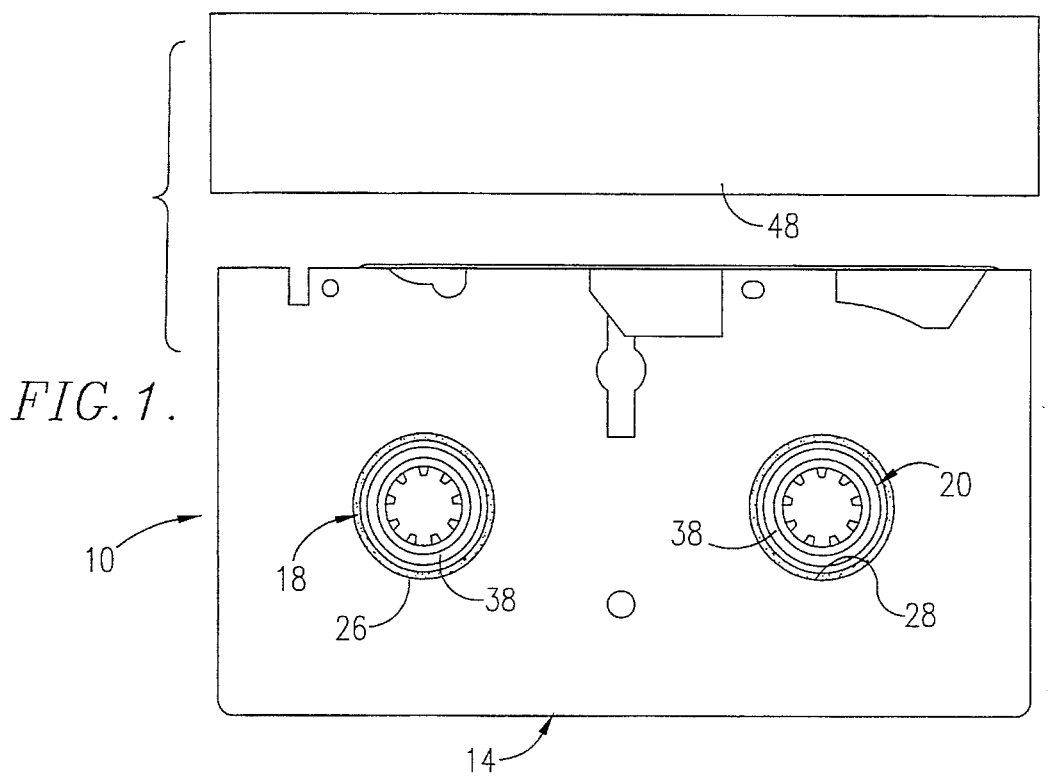
FIG. 1 is a bottom view of a lightweight solid-core video cassette cartridge constructed in accordance with the preferred embodiment.
Figure 2:
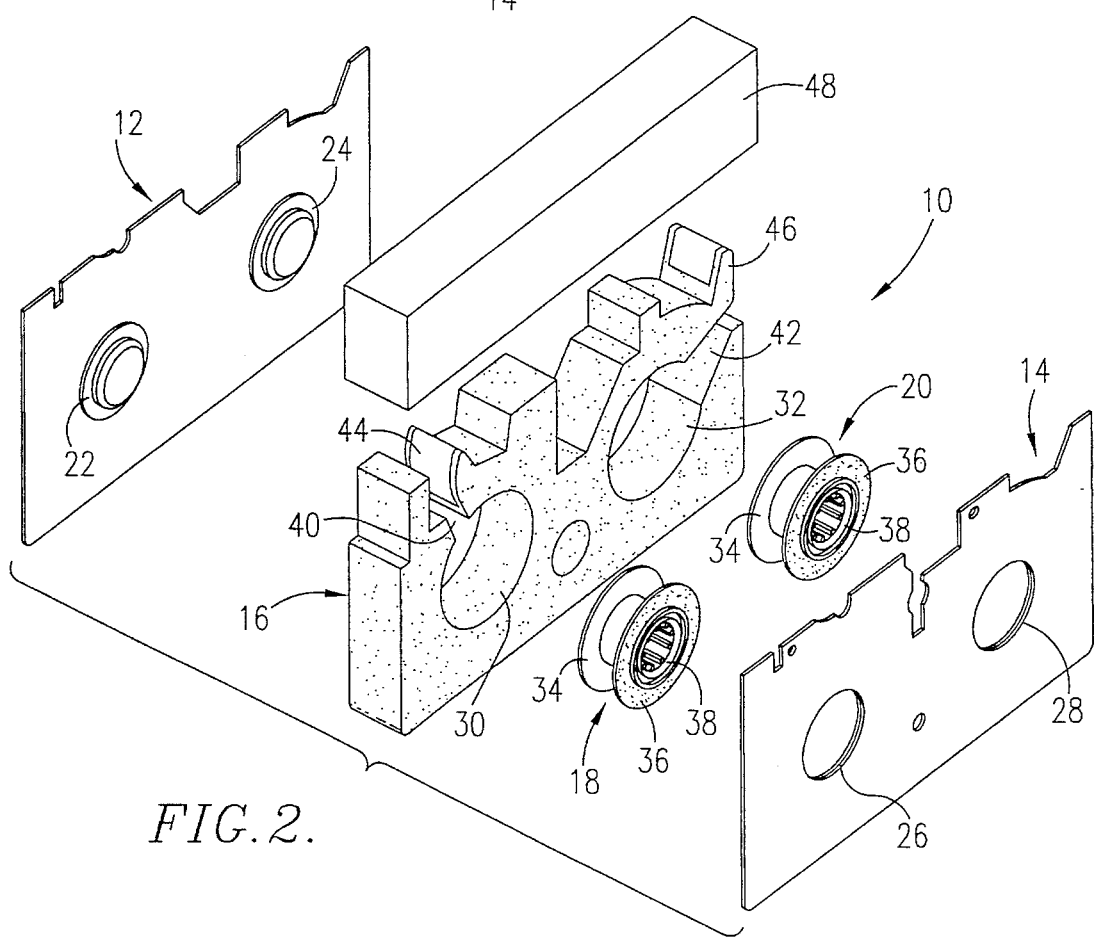
FIG. 2 is an exploded view of the cassette cartridge illustrating the cartridge's components.
Figure 3:
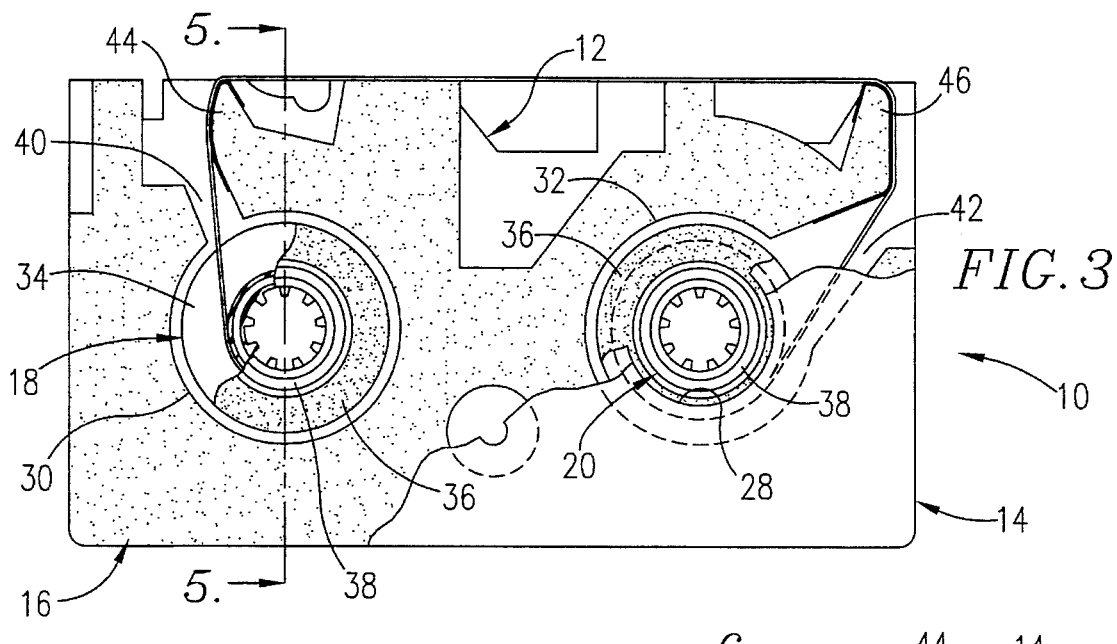
FIG. 3 is a bottom view of the cartridge with a portion of the bottom panel removed.
Figure 4:
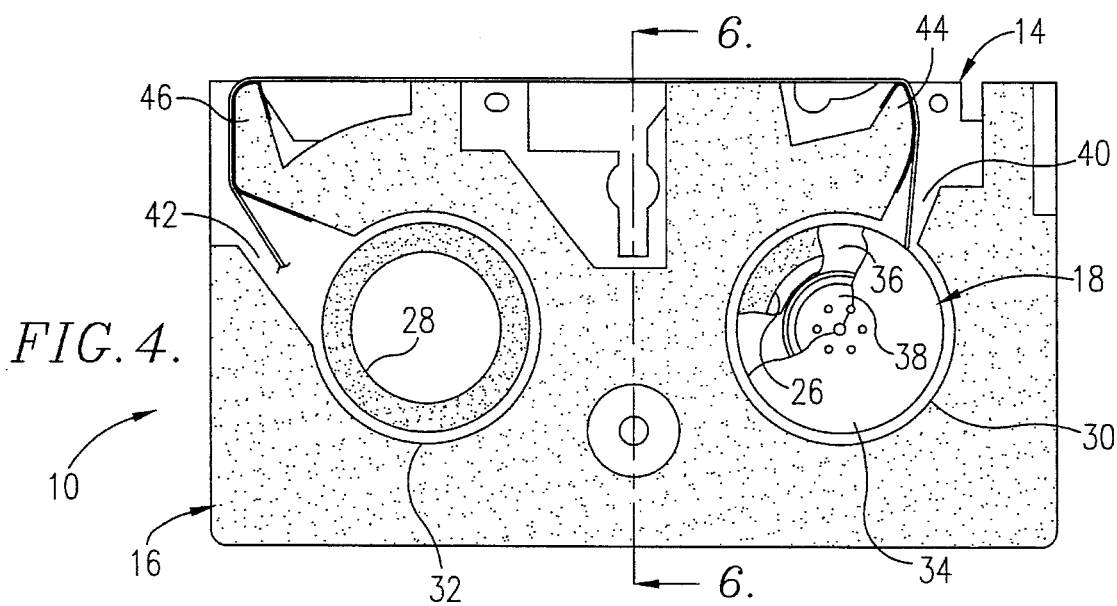
FIG. 4 is a top view of the cartridge with a portion of the top panel removed.
Figure 5:
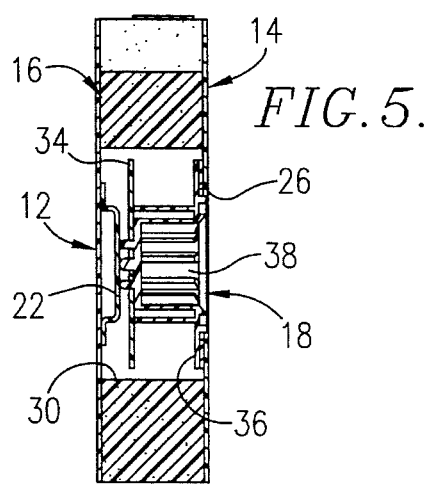
FIG. 5 is a sectional view taken along line 5—5 of FIG. 3.
Figure 6:
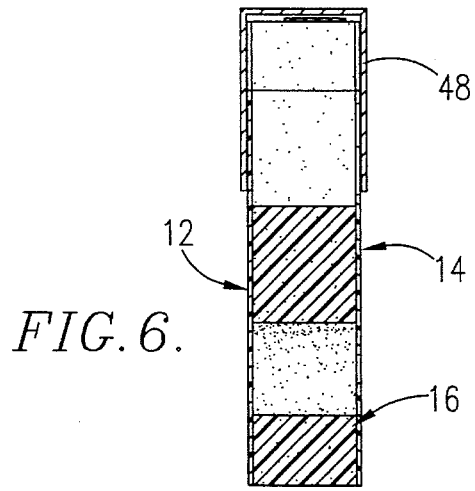
FIG. 6 is sectional view taken along line 6—6 of FIG. 3.

Referring to the figures and particularly FIG. 2, a lightweight solid-core video cassette cartridge 10 constructed in accordance with the preferred embodiment is illustrated. The cassette cartridge 10 is configured for use with a conventional video cassette recorder (VCR).

The preferred lightweight solid-core video cassette cartridge 10 broadly includes a cartridge shell formed from a pair of spaced apart top and bottom panels 12 and 14, a solid-core structural member 16, and a pair of video tape reels 18 and 20 rotatably mounted within the cartridge shell for winding of video tape.

In more detail, top and bottom panels 12 and 14 are generally rectangular in shape and are preferably formed of thin synthetic resin material. When cartridge 10 is assembled, top and bottom panels 12 and 14 are spaced a distance apart to define an interior hollow chamber therebetween. As described in more detail below, the solid core structural member 16 is positioned within this hollow chamber for maintaining the spaced relationship between the top and bottom panels 12 and 14.

Top panel 12 includes a pair of reel springs 22 and 24 bonded to its interior wall. As discussed in detail in copending U.S. patent application Ser. No. 08/001,670, filed Jan. 7, 1993, titled LIGHTWEIGHT VIDEO CASSETTE CARTRIDGE, the video tape reels 18 and 20 are subjected to an upward force from the VCR drive spindles which tends to push the reels 18 and 20 upward towards the top panel 12 and out of alignment. The reel springs 22 and 24 are configured to exert an opposing downward force upon the video tape reels 22 and 24 when subjected to an upward force delivered by the VCR spindles.

Bottom panel 14 includes walls defining a pair of openings 26 and 28 for receiving the drive spindles of a VCR. The openings 26 and 28 are aligned with the video tape reels 18 and 20 so that the VCR spindles cooperate with the video tape reels 18 and 20.

A portion of the inner surface of the bottom panel 14 is textured to provide a friction brake system to inhibit the video tape reels 18 and 20 from rotating when the cassette cartridge is not in use. The flanges of the video tape reels 18 and 20 are also textured to engage the textured portion of the bottom panel 14. This friction braking system eliminates the need for complicated active braking systems found in prior art video cassette cartridges.

The solid core structural member 16 is provided for maintaining the spaced relationship between the top and bottom panels 12 and 14. The solid core structural member 16 is a single piece unitary core member and is preferably formed of lightweight materials such as styrofoam, cardboard, synthetic resin, inflated or expanded corn starch, carbon fiber or fiberglass. The solid core member 16 may be formed of honeycomb or corrugated layers.

The solid core member 16 presents a thickness greater than or equal to the width of the video tape wound on the video tape reels 22 and 24. In preferred forms, the solid core structural member 16 presents a volume nearly equal to the volume of the cartridge shell hollow chamber. Accordingly, the solid core member 16 fills substantially the entire volume of the cartridge shell hollow chamber.

The top and bottom panels 12 and 14 can be secured to the solid core member 16 by conventional adhesives such as glue or tape. Alternatively, the cartridge may include formed pins on the top and bottom panels 12 and 14 which penetrate through the solid core member 16 and snap together to interlock the top and bottom panels 12 and 14. With this configuration, the entire surface areas of top and bottom panels 12 and 14 are supported by the solid core member 16. Thus, the assembled video cassette cartridge has substantial rigidity. This allows the cartridge to withstand rough handling and mailing. Moreover, since the solid core member 16 is formed of lightweight materials, the assembled video cassette cartridge weighs substantially less than prior art video cassette cartridges.

As best illustrated in FIG. 2, the solid core structural member 16 includes walls defining a pair of circular reel wells 30 and 32. The circular reel wells 30 and 32 are configured for receiving a pair of video tape reels 18 and 20. The video tape reels 18 and 20 are rotatably mounted within the circular reel wells for winding video tape. In preferred forms, video tape reels 18 and 20 are one-piece spool-shaped thermoform molded units and include a pair of flanges 34 and 36 surrounding a central drum 38. The video tape is initially wound on the drum 38 of one of the reels and is transferred to the other reel during play. The reels 18 and 20 are configured to interact with the drive spindles of a VCR.

The solid core structural member 16 also includes walls defining a pair of passageways 40 and 42 connecting the circular reel wells 30 and 32 to the exterior of the cassette cartridge 10. The passageways 40 and 42 are provided for delivering video tape to and from the video tape reels 18 and 20. The walls of the passageways 40 and 42 each present a guide post 44 and 46 for guiding the video tape in and out of the circular reel wells 30 and 32. The guide posts 44 and 46 are covered by a friction resistant tape to decrease friction between the video tape and the guide posts 44 and 46. The tape covered guide posts 44 and 46 serve the same function as rollers used in prior art cassette cartridges, but conserve manufacturing time and cost due to their integral nature.

The lightweight solid-core video cassette cartridge 10 also includes a removable dust cover 48 which slips over the front end of the cartridge to protect the exposed video tape from contamination or damage when the cartridge is not in use.

The cassette cartridge 10 can be assembled in several easy steps. First, the video tape reels 18 and 20 are inserted into the circular reel wells 30 and 32 of solid core structural member 16. Second, the top and bottom panels 12 and 14 are bonded to their respective sides of the solid core member 16. Third and finally, the removable dust cover 48 is placed over the front end of the cartridge 10 to protect the exposed video tape.

Figure 7:
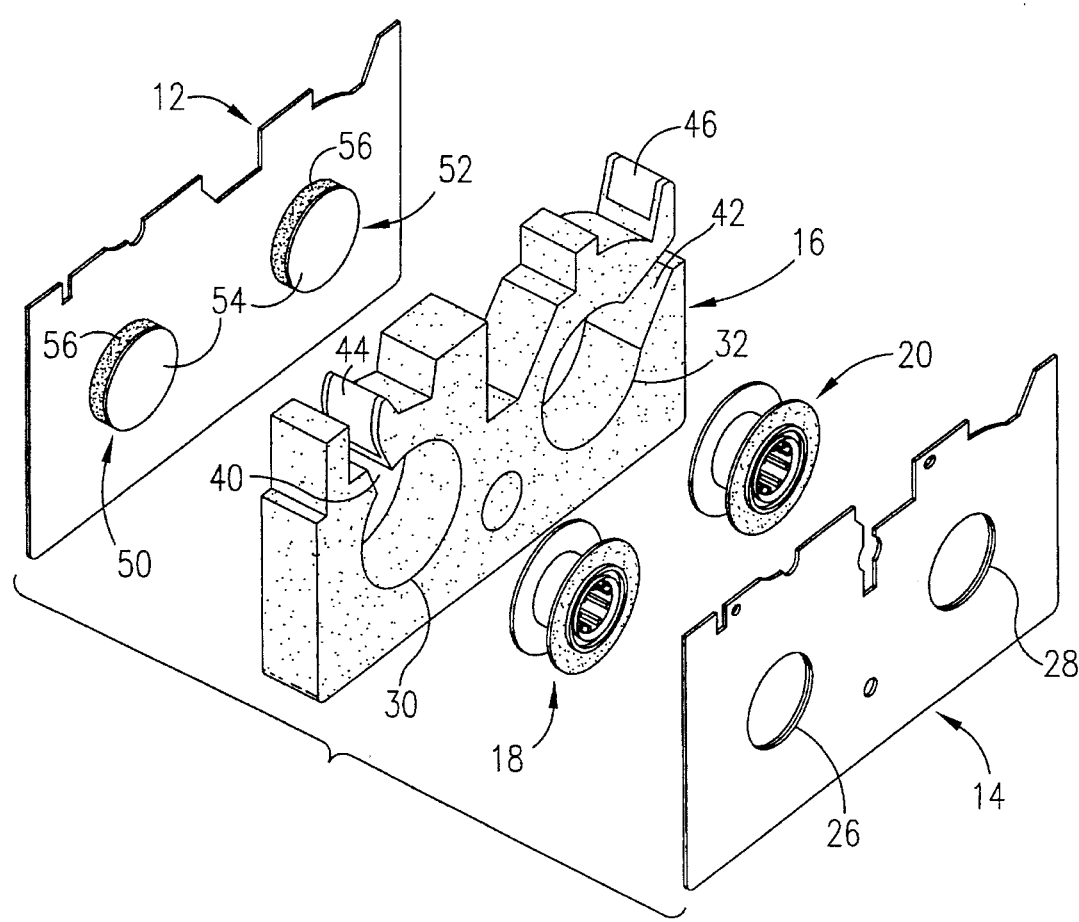
FIG. 7 is an exploded view of a second embodiment of the cassette cartridge illustrating the cartridge's various components.
Figure 8:
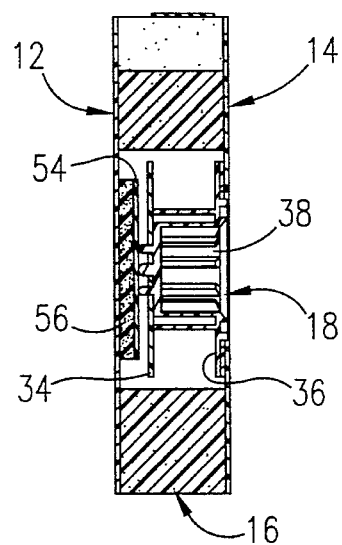
FIG. 8 is a side view of the cassette cartridge illustrated in FIG. 7.

FIGS. 7 and 8 illustrate a second embodiment of the present invention including novel reel springs 50 and 52. The reel springs 50 and 52 are provided for maintaining the alignment of the video tape reels 18 and 20 within the cartridge and are bonded inside the top panel 12 of the cartridge. Each reel spring includes a rigid circular disk 54 formed of plastic or other similar material and a circular spring portion 56 formed of lightweight sponge material or foam rubber. The circular spring portion 56 preferably presents a thickness of approximately ⅛–¼ inch.

One face of the circular spring portion 56 is bonded inside the top panel 12 immediately opposite the circular reel wells 30 and 32 of the solid core member 16. The other face is bonded to the rigid circular disk 54. Accordingly, the rigid circular disks 54 contact the video tape reels 18 and 20, and the circular spring portions 56 bias the video tape reels 18 and 20 downward while the cartridge is in use.

When the video tape reels 18 and 20 are pushed upward by the VCR drive spindles, the circular spring portions 56 compress slightly. The compressed spring portions 56 provide an opposing force on the video tape reels 18 and 20 which maintains the alignment of the reels.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A video cassette cartridge for holding and dispensing video tape for use in a video cassette recorder/player, comprising:

a cartridge shell including a top panel and a bottom panel which mate to form said shell;

a suppJy reel and a take-up reel rotatably mounted within said cartridge shell and configured for receiving and winding video tape, said reels being subject to an upward force from the video cassette recorder/player which tends to push the reels out of alignment, said reels being further subjected to the upward creeping of the video tape during winding of the reels;

a pair of reel springs attached to said top panel for maintaining the alignment and position of said reels, said reel springs each including a rigid reel engaging portion and a compressible biasing portion for biasing said rigid reel engaging portion towards one of said reels, wherein said biasing portion is formed of foam rubber material.

2. A video cassette cartridge for holding and dispensing video tape for use in a video cassette recorder/player, comprising:

a cartridge shell including a top panel and a bottom panel which mate to form said shell;

a supply reel and a take-up reel rotatably mounted within said cartridge shell and configured for receiving and winding video tape, said reels being subject to an upward force from the video cassette recorder/player which tends to push the reels out of alignment, said reels being further subjected to the upward creeping of the video tape during winding of the reels;

a pair of reel springs attached to said top panel for maintaining the alignment and position of said reels, said reel springs each including a rigid reel engaging portion and a compressible biasing portion for biasing said rigid reel engaging portion towards one of said reels, wherein said biasing portion is formed of sponge material, 3. A video cassette cartridge for holding and dispensing video tape for use in a video cassette recorder/player, comprising:

a cartridge shell including a top panel and a bottom panel which mate to form said shell;

a supply reel and a take-up reel rotatably mounted within said cartridge shell and configured for receiving and winding video tape, said reels being subject to an upward force from the video cassette recorder/player which tends to push the reels out of alignment, said reels being further subjected to the upward creeping of the video tape during winding of the reels;

a pair of reel springs attached to said top panel for maintaining the alignment and position of said reels, said reel springs each including a rigid reel engaging portion and a compressible biasing portion for biasing said rigid reel engaging portion towards one of said reels, wherein said biasing portion is formed of rubber material.

4. A video cassette cartridge for use in a video cassette recorder/player comprising:

a cartridge shell including spaced apart top and bottom panels defining an interior hollow chamber therebetween;

a solid core structural member presenting a volume nearly equal to the volume of said interior chamber positioned within said hollow chamber for maintaining the spaced relationship between said top and bottom panels, said solid core member including walls defining a pair of circular reel wells; and a pair of video tape reels rotatably mounted within said circular wells for winding of video tape;

whereby said solid core structural member and said video tape reels fill substantially the entire volume of said cartridge shell hollow chamber, wherein said solid core structural member is formed of styrofoam.

5. The video cassette cartridge as set forth in claim 4, further including means for inhibiting the rotation of said reels within said circular reel wells when not in use, said means being integrally formed on said circular wells and said reel flanges.

6. The video cassette cartridge as set forth in claim 5, said reel rotation inhibiting means consisting of a textured surface integrally molded on said circular wells and said reel flanges.

7. The video cassette cartridge as set forth in claim 4, said solid core structural member including walls defining a pair of passageways connected to said circular reel wells for delivering video tape to and from said video tape reels.

8. A video cassette cartridge for use in a video cassette recorder/player comprising:

a cartridge shell including spaced apart top and bottom panels defining an interior hollow chamber therebetween;

a solid core structural member presenting a volume nearly equal to the volume of said interior chamber positioned within said hollow chamber for maintaining the spaced relationship between said top and bottom panels, said solid core member including walls defining a pair of circular reel wells; and a pair of video tape reels rotatably mounted within said circular wells for winding of video tape;

whereby said solid core structural member and said video tape reels fill substantially the entire volume of said cartridge shell hollow chamber wherein said solid core structural member is formed of cardboard.

* * * * *